United States Patent
Bailey et al.

(10) Patent No.: US 7,713,135 B2
(45) Date of Patent: May 11, 2010

(54) GOLF PITCH MARK REPAIRER

(75) Inventors: Kevin Bailey, Newbury (GB); Paul Simpson, Witney (GB)

(73) Assignee: Northcroft Golf Limited, Hampshire (GB)

( * ) Notice: Subject to any disclaimer, the term of this patent is extended or adjusted under 35 U.S.C. 154(b) by 118 days.

(21) Appl. No.: 12/089,246

(22) PCT Filed: Sep. 27, 2006

(86) PCT No.: PCT/GB2006/050305

§ 371 (c)(1),
(2), (4) Date: Apr. 9, 2008

(87) PCT Pub. No.: WO2007/042838

PCT Pub. Date: Apr. 19, 2007

(65) Prior Publication Data

US 2008/0214329 A1    Sep. 4, 2008

(30) Foreign Application Priority Data

Oct. 7, 2005   (GB) ................................. 0520420.1
Mar. 23, 2006  (GB) ................................. 0605753.3

(51) Int. Cl.
*A63B 57/00* (2006.01)

(52) U.S. Cl. ..................... 473/286; 403/361; 403/321; 172/378

(58) Field of Classification Search .............. 473/282, 473/285, 286; 403/321, 325, 326, 329, 361, 403/366; 172/378
See application file for complete search history.

(56) References Cited

U.S. PATENT DOCUMENTS 1,739,780 A    12/1929 Buhrke (Continued)

FOREIGN PATENT DOCUMENTS

DE    103 03 137    7/2004

(Continued)

OTHER PUBLICATIONS

International Search Report for corresponding Application No. PCT/GB2006/050305 mailed Jan. 9, 2007.

(Continued)

*Primary Examiner*—Stephen L. Blau
(74) *Attorney, Agent, or Firm*—Renner, Otto, Boisselle & Sklar, LLP

(57) ABSTRACT

A golf pitch mark repairer (101) is adapted to be removably retained on an extremity of a golf club, thereby allowing a golfer to utilize the reach afforded by the golf club to facilitate repair of the pitch mark. The pitch mark repairer (101) comprises a sleeve (103) for receiving the golf club extremity, and a retaining mechanism in the form of resilient tabs (111*a*, 111*b*) adapted to resist movement of the golf club relative to the pitch mark repairer (101). The golf club extremity is inserted with a sliding collar (117) positioned towards closed end (105) of sleeve (103). The sleeve (103) comprises windows (116*a*, 116*b*) through which respective portions of resilient tabs (111*a*, 111*b*) are urged to protrude outwardly when the golf club extremity is inserted. Thereafter the sliding collar (117) is engaged by sliding it along the sleeve (103) towards its open end (107). This acts to urge tabs (111*a*, 111*b*), and in particular respective valley portions (114*a*, 114*b*) thereof, into tighter engagement with the putter handle, resulting in a strong grip on the putter handle.

22 Claims, 3 Drawing Sheets

U.S. PATENT DOCUMENTS

| | | | | |
|---|---|---|---|---|
| 2,529,219 | A * | 11/1950 | Kost | 403/361 |
| 2,801,875 | A | 8/1957 | McEvoy | |
| 3,130,990 | A * | 4/1964 | Leitmann | 403/357 |
| 3,206,067 | A | 9/1965 | Smith et al. | |
| 4,588,157 | A * | 5/1986 | Mills | 248/545 |
| 5,261,434 | A | 11/1993 | Fodero | |
| 5,437,449 | A | 8/1995 | Zink | |
| 5,765,647 | A | 6/1998 | Hood | |
| 5,782,443 | A | 7/1998 | La Fontaine | |
| 5,816,633 | A | 10/1998 | Odom | |
| 5,839,972 | A | 11/1998 | Swanson | |
| 5,899,511 | A | 5/1999 | Dinatale | |
| 6,048,274 | A | 4/2000 | Lesage | |
| 6,309,308 | B1 | 10/2001 | Bennett | |
| 6,413,004 | B1 * | 7/2002 | Lin | 403/176 |
| 6,510,578 | B1 * | 1/2003 | Cyr et al. | 15/176.6 |
| 6,641,325 | B2 * | 11/2003 | Schwarz | 403/329 |
| 6,824,180 | B2 * | 11/2004 | Tomchak | 294/57 |
| 2001/0010778 | A1 * | 8/2001 | Hilton et al. | 403/321 |
| 2002/0132679 | A1 | 9/2002 | Wilde et al. | |
| 2003/0235463 | A1 * | 12/2003 | Neumann et al. | 403/329 |
| 2004/0038755 | A1 | 2/2004 | Laux et al. | |
| 2006/0058109 | A1 * | 3/2006 | Wilson | 473/286 |

FOREIGN PATENT DOCUMENTS

| | | |
|---|---|---|
| GB | 2 282 973 | 4/1995 |
| WO | 90/00107 | 1/1990 |
| WO | 00/57964 | 10/2000 |
| WO | 03/084589 | 10/2003 |
| WO | 2006/008086 | 1/2006 |

OTHER PUBLICATIONS

British Search Report for corresponding Application No. GB0605753.3 dated Jul. 11, 2006.

British Search Report for corresponding Application No. GB0706581.6 dated Aug. 3, 2007.

British Search Report for corresponding Application No. GB0520420.1 dated Jan. 10, 2006.

* cited by examiner

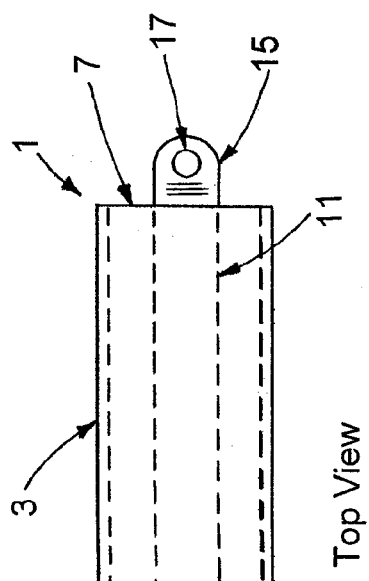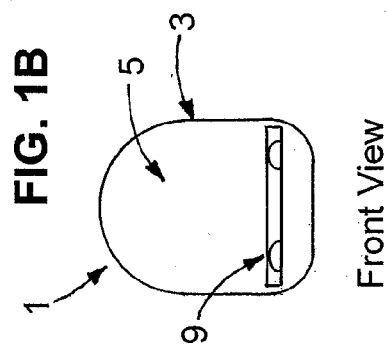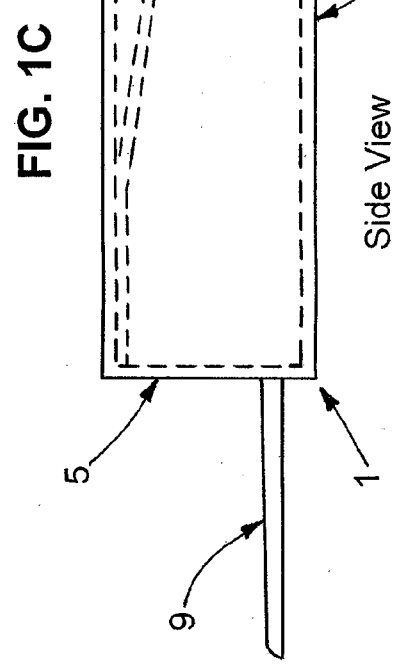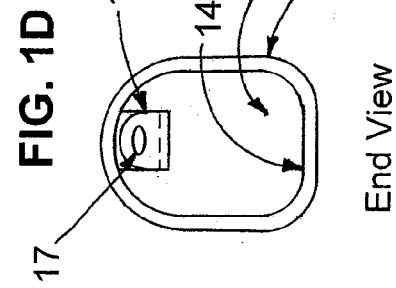

GOLF PITCH MARK REPAIRER

TECHNICAL FIELD

The present invention relates to a golf pitch mark repairer.

BACKGROUND

When a golf ball strikes the green it often leaves a small indentation, referred to as a "pitch mark". To eradicate these holes, golfers use a pitch mark repairer, which is typically a two-pronged piece of metal or plastic that allows the player to lift up the turf compressed by the impact of the golf ball, thereby removing the indentation. It is also considered good practice to repair other pitch marks if they have been left un-repaired by previous players. Golf clubs generally ask players to repair pitch marks, since an indentation caused by a golf ball will generally be unnoticed within 24 hours if repaired within a few minutes, but damage to the green will take very much longer to recover if not.

Therefore, removing and repairing pitch marks is considered very important by all clubs and players, and it is considered bad etiquette if a player does not make at least some attempt to repair his or her pitch mark.

At present, a golfer must repeatedly bend over to reach their pitch marks on the green, and this can put a significant strain on the golfer's back over time. This is particularly the case in view of the popularity of golf among an ageing population.

SUMMARY

According to a first aspect of the present invention, there is provided a golf pitch mark repairer for repairing a pitch mark left by a golf ball after landing on a green, the pitch mark repairer being adapted to be removably retained on an extremity of a golf club, thereby allowing a golfer to utilise the reach afforded by the golf club to facilitate repair of the pitch mark using the pitch mark repairer, comprising a sleeve for receiving the golf club extremity and a retaining mechanism adapted to resist movement of the golf club relative to the pitch mark repairer, the retaining mechanism comprising a resilient tab adapted and arranged to urge against the golf club extremity when the golf club extremity is inserted into the sleeve.

The resilient tab may be adapted and arranged to be urged outwardly when the golf club extremity is inserted into the sleeve.

The resilient tab may comprise a portion adapted and arranged to present an angled surface to the golf club extremity as it is inserted into the sleeve, thereby urging the resilient tab outwards.

The sleeve may comprise a window through which at least a portion of the resilient tab is urged to protrude outwardly when the golf club extremity is inserted.

The golf pitch mark repairer may further comprise a sliding collar at least partly surrounding the sleeve that is slidable from a first position along the sleeve, in which the portion is able so to protrude when the golf club extremity is inserted, to a second position along the sleeve in which the sliding collar acts to urge the protruding portion back inwardly, thereby increasing a retaining force of the resilient tab on the golf club extremity when the sliding collar is in the second position.

The resilient tab and window may be mutually formed from a wall of the sleeve.

The resilient tab may comprise an inwardly-facing valley-shaped gripping portion.

The resilient tab may be an elongate tab facing substantially along the length of the sleeve.

The resilient tab may be fixed at one end thereof and free at the other. The angled surface may be provided towards the free end.

The resilient tab may be fixed at both ends thereof.

The golf pitch mark repairer may comprise two or more such resilient tabs. The two or more resilient tabs may be arranged in an opposing fashion.

The golf pitch mark repairer may comprise such a window corresponding to each resilient tab.

The sleeve may be shaped at least internally to correspond at least to some degree to the shape of the golf club extremity.

The golf club extremity may be an end portion of the golf club handle.

The golf club may be a putter.

The sleeve may have an open end and a closed end, the open end being for receiving the golf club extremity.

The sleeve may be substantially enclosed except at its open end.

The sleeve may have an enclosed cross section along at least part of its length. This cross section may be unbroken.

At least an open end of the sleeve for receiving the golf club extremity may have an enclosed cross section, which may also be unbroken.

An open end of the sleeve for receiving the golf club extremity may be substantially resilient to moderate outward radial forces applied at any point on its cross section, such as those forces applied when inserting the golf club extremity into the sleeve.

The sleeve may be adapted when at rest to present an opening at least as large as a cross section of the golf club extremity.

At least one end of the resilient tab may be fixed to or emanates from a side wall of the sleeve.

BRIEF DESCRIPTION OF THE DRAWINGS

FIG. 1A is a top view of a pitch mark repairer according to a first embodiment of the present invention;

FIG. 1B is a front view of the pitch mark repairer according to the first embodiment of the present invention;

FIG. 1C is a side view of the pitch mark repairer according to the first embodiment of the present invention;

FIG. 1D is an end view of the pitch mark repairer according to the first embodiment of the present invention;

DETAILED DESCRIPTION

Figure 2A:
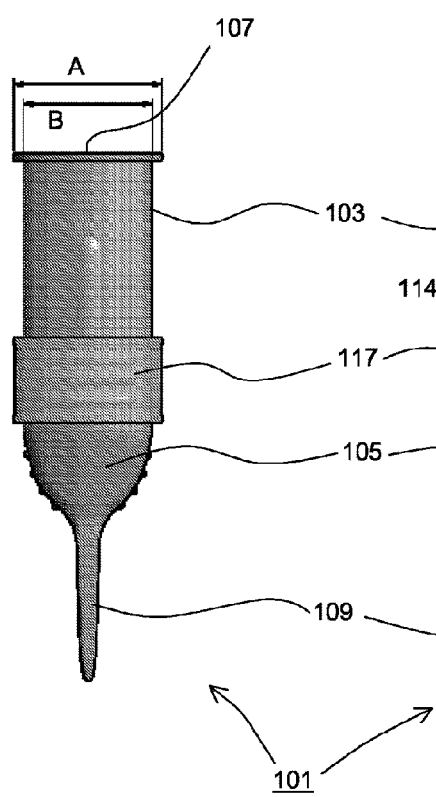
FIG. 2A is a side view of a pitch mark repairer according to a second embodiment of the present invention.

In view of the above-mentioned difficulties associated with bending over repeatedly to repair pitch marks, an embodiment of the present invention provides a pitch mark repairer that is adapted to be removably retained on an extremity of a golf club, for example on the end of the handle of a putter. This allows the golfer to utilise the reach of the putter to facilitate repair of a pitch mark using the pitch mark repairer, holding the putter head end of the club whilst repairing the pitch mark with the pitch mark repairer attached to the other, handle, end. This considerably reduces the requirement for bending in the course of repairing the pitch mark, as compared with conventional pitch mark repairers, and greatly reduces the amount of effort required to effect a suitable repair.

A pitch mark repairer 1 according to a first embodiment of the present invention is shown in FIGS. 1A to 1D. The pitch mark repairer 1 comprises a sleeve 3 having a closed end 5 and an open end 7. Two prongs 9 extend from the closed end 5 of sleeve 3 substantially at right angles. A resilient retaining tab 11 extends from a top inside surface 13 of the sleeve 3, angled away from the surface 13. The free end of the tab 11 is provided with an angled portion 15.

In use, the head of the putter is inserted into the open end 7 of the sleeve 3. The angled portion 15 of the tab 11 presents an angled surface to the putter handle being inserted into the sleeve 3, and contact between the putter handle and the angled portion 15 urges the resilient tab 11 towards the top surface 13 of the sleeve, making way for the putter handle is it moves inside the sleeve 3. Due to the resiliency of the tab 11, once the putter handle is inserted, the tab is urged against the putter handle, which in turn also urges the putter handle against the opposite inside surface 14 of the sleeve 3. Since the putter handle is typically surrounded by a grip made of rubber or a rubber-like material, this acts to retain the pitch mark repairer 1 on the putter handle during use. The prongs 9 are generally similar to those found on a conventional pitch mark repairer, and may be formed of metal or plastic, approximately 3 inches (7.6 cm) long.

Putter handles generally differ from other golf clubs in that they are not round but have a generally flat surface on one side of the putter grip. The sleeve 3 of the pitch mark repairer 1 is shaped accordingly, as shown best in FIGS. 1B and 1D. The use of a shaped sleeve 3 and a retaining tab 11 allows the pitch mark repairer 1 to be firmly located and retained on the end of the putter shaft, with good resistance against rotational forces acting on the pitch mark repairer 1 in use.

Figure 2C:
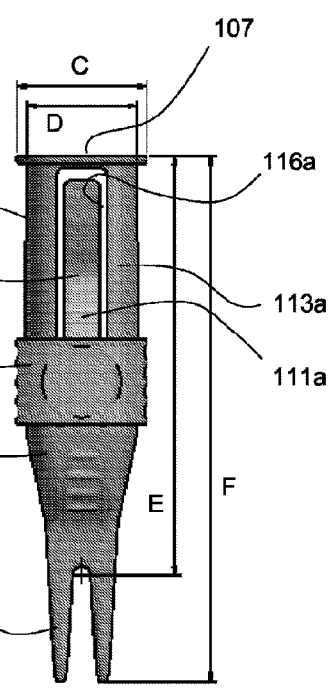
FIG. 2C is a top view of the pitch mark repairer according to the second embodiment of the present invention.
Figure 2B:
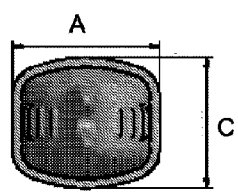
FIG. 2B is a front view of the pitch mark repairer according to the second embodiment of the present invention.
Figure 2D:
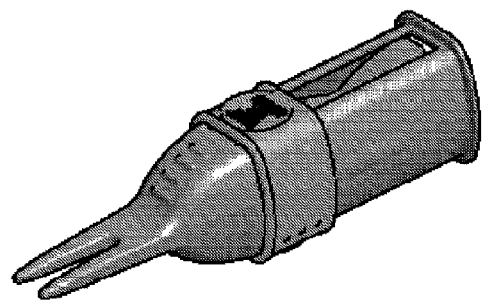
FIG. 2D is a perspective view of the pitch mark repairer according to the second embodiment of the present invention.
Figure 3A:
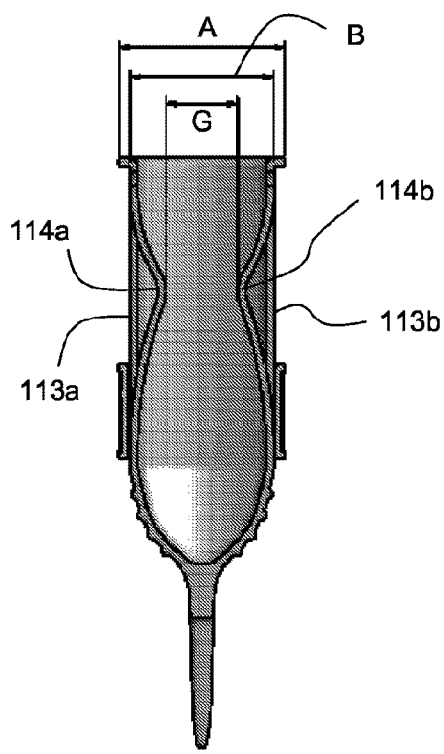
FIG. 3A is a cut-away side view of the pitch mark repairer according to the second embodiment of the present invention.
Figure 3C:
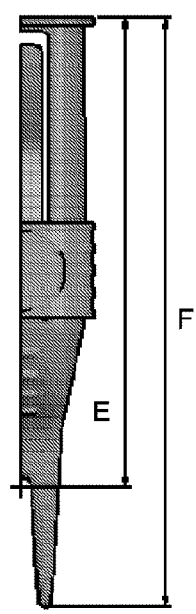
FIG. 3C is a cut-away top view of the pitch mark repairer according to the second embodiment of the present invention.
Figure 3B:
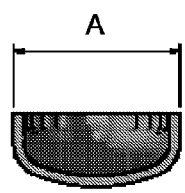
FIG. 3B is a cut-away front view of the pitch mark repairer according to the second embodiment of the present invention.
Figure 3D:
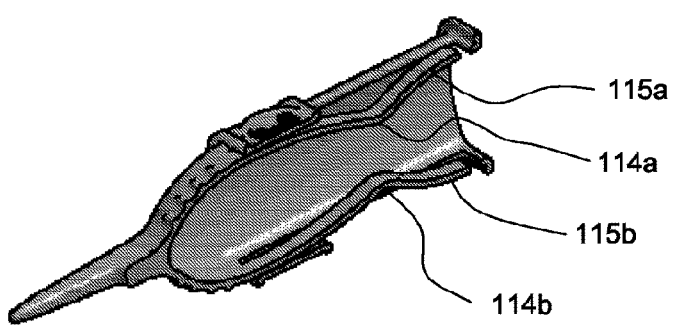
FIG. 3D is a cut-away perspective view of the pitch mark repairer according to the second embodiment of the present invention.

A pitch mark repairer 101 according to a second embodiment of the present invention is shown in FIGS. 2A to 3D. The pitch mark repairer 101 comprises a sleeve 103 having a closed end 105 and an open end 107. Two prongs 109 extend from the closed end 105 of sleeve 103 substantially at right angles. A resilient retaining tab 111a is formed within a window 116a provided in top wall 113a of the sleeve 103, the resilient tab 111a having a fixed end merging with the top wall 113a towards the closed end 105 of the sleeve 103 and a free end substantially level with the top wall 113a towards the open end 107 of the sleeve 103. The resilient tab 111a is shaped to curve inwardly to form a valley portion 114a between the fixed and free ends, as can best be seen in FIGS. 3A and 3D. The free end of the tab 111a presents an angled portion 115a to an object being inserted into the open end 107 of the sleeve 103. With the sliding collar 117 in the position shown in the Figures, the free end of retaining tab 111a sits naturally at substantially the same level as the top wall 113a, as can best be seen in FIG. 3A, so that the entirety of the retaining tab 111a is contained with the external profile defined generally by the sleeve 103.

A similar retaining tab 111b is also formed in a bottom wall 113b of the sleeve 103, so as to present two opposing retaining tabs 111a, 111b in the interior of the sleeve 103. A sliding collar 117 is also provided around the sleeve 103, slidable between a first position towards the closed end 105 of the sleeve 103, substantially covering the fixed end of the retaining tabs 111a, 111b, and a second position towards the open end 107 of the sleeve 103, substantially covering the free end of the retaining tabs 111a, 111b.

In use, with the sliding collar 117 in the first position, the handle of the putter is inserted into the open end 107 of the sleeve 103. Respective angled portions 115a, 115b of the tabs 111a, 111b present angled surfaces 115a, 115b to the putter handle being inserted into the sleeve 103, and contact between the putter handle and the angled surfaces 115a, 115b urges the resilient tabs 111a, 111b outward, towards and through respective windows 116a and 116b in the top and bottom walls 113a, 113b of the sleeve 103, making way for the putter handle is it moves inside the sleeve 103. Due to the resiliency of the tabs 111a, 111b, once the putter handle is fully inserted, the resilient tabs 111a, 111b will be urged to some extent against the putter handle, particularly the valley portions 114a, 114b thereof, which act like a pair of claws. Since the putter handle is typically surrounded by a grip made of rubber or a rubber-like material, this acts partly to retain the pitch mark repairer 101 on the putter handle at least to some extent during use.

At this point, the sliding collar 117 can be engaged by sliding it along the sleeve 103 towards its open end 107 to the second position. Since at least the respective free ends of the resilient tabs 111a and 111b will be protruding through the respective windows 116a and 116b, the sliding of the collar 117 acts on the outer surface of the protruding parts of the tabs 111a, 111b to urge them, and in particular the valley portions 114a, 14b thereof, into tighter engagement with the putter handle, resulting in a stronger and more secure grip on the putter handle. With the sliding collar 117 engaged in this way, the pitch mark repairer 101 can be used more reliably to repair pitch marks.

In order to remove the pitch mark repairer 101 from the putter handle, the sliding collar 117 is slid back to the first position, releasing the tight grip of the resilient tabs 111a, 111b, and enabling the pitch mark repairer to be slid off the putter handle.

The prongs 109 are generally similar to those found on a conventional pitch mark repairer, and may be formed of metal or plastic, approximately 3 inches (7.6 cm) long.

Suitable dimensions of an example pitch mark repairer 101 are as follows, with the following letter references corresponding to those marked in the Figures; these values are mere examples and are not intended to be limiting:

| | |
|---|---|
| A: | 42 mm |
| B: | 34 mm |
| C: | 37.5 mm |
| D: | 27 mm |
| E: | 109 mm |
| F: | 140 mm |
| G: | 23 mm |

The components of the pitch mark repairer 101 are preferably moulded. In the second embodiment, the window 116a and resilient tab 111a can conveniently be mutually formed, for example by pressing/cutting out the periphery of the window shape except at one end, leaving the resilient tab 111*a* formed integrally and mutually within the window 116*a*; the resilient tab 111*a* can then be shaped appropriately. The sliding collar is suitably adapted to be applied with a promotional design, company logo or other type of advertising information, either integrated into its moulded construction or applied separately, for example by adhesive means. Such promotional material can also be placed elsewhere on the pitch mark repairer, such as on the sleeve 103.

The sleeve 103 is shaped in such a way to allow the pitch mark repairer 101 to be firmly located and retained on the end of the putter shaft, with good resistance against rotational forces acting on the pitch mark repairer 101 in use.

Grips on putter handles are available in varying thicknesses and shapes, and more than one size of pitch mark repairer can be produced to account for this, although a particular size of pitch mark repairer 1, 101 can function effectively on a range of handle sizes; there is no requirement for an exact fit between the putter handle and the sleeve 3, 103.

The pitch mark repairer 1, 101 and sleeve 3, 103 can be provided in a variety of lengths, and as it is anticipated that the pitch mark repairer 1, 101 will hang on the side the golf bag (and not carried in the pocket), the length of the sleeve 3, 103 would not be in itself significant in as far as the convenience of the device is concerned. Pitch mark repairers do tend to damage pockets as they can be quite sharp and it is generally better that they are kept in the bag than the pocket from purely a practical point of view. Nevertheless, a pitch mark repairer embodying the present invention is also suitable and convenient for carrying in the pocket, if preferred. If stored out of the pocket, the pitch mark repairer must be accessible, and unlike conventional pitch mark repairers, an embodiment of the present invention can be provided with an attachment mechanism that allows the repairer to be removably attached onto the outside of the golf bag. One simple such mechanism is shown in FIGS. 1A and 1D as a hole 17 provided in the end portion of the tab 11. However, more complicated clipping or attachment mechanisms are possible.

Since a putter is normally carried onto the green, a pitch mark repairer embodying the present invention would usually be adapted to be retained on a putter handle as described above. However, an embodiment of the present invention can also be applied to other types of golf club.

In addition, although the first embodiment of the present invention is described above in which the pitch mark repairer is adapted for attached to the handle end of the club, it is also possible that a suitably-adapted pitch mark repairer embodying the present invention would be removably attached to the club-head end of the golf club, so that the golfer would hold the handle end of the club whilst repairing the pitch mark. The head of the club could have a retaining mechanism in the form of a socket cut into it that would allow the pitch repairer to clip directly into the base of the club. Club heads with appropriate sockets could accept pitch mark repairers of various styles and designs.

It will be appreciated that modifications of the above-described embodiments can be made within the scope of the present invention as defined by the appended claims. For example, although it is preferable to have two opposed retaining tabs 111*a* and 111*b*, it would be possible to make do with only one; it would also be possible to have three or four, for example. Also, although the resilient tabs 111*a* and 111*b* are shown and described as having a free end and a fixed end, it is also possible that both ends are fixed; such a resilient tab would be suitably shaped between the two fixed ends to allow at least a portion to be urged outwardly to protrude through its window to be acted on in the reverse direction by the sliding collar as it moves over the protruding portion—for example, a sort of W-shaped retaining tab would be suitable.

The invention claimed is:

1. A golf pitch mark repairer for repairing a pitch mark left by a golf ball after landing on a green, the pitch mark repairer being adapted to be removably retained on an extremity of a golf club, thereby allowing a golfer to utilise the reach afforded by the golf club to facilitate repair of the pitch mark using the pitch mark repairer, comprising a sleeve for receiving the golf club extremity and a retaining mechanism adapted to resist movement of the golf club relative to the pitch mark repairer, the retaining mechanism comprising a resilient tab adapted and arranged to urge against the golf club extremity when the golf club extremity is inserted into the sleeve, and wherein the sleeve comprises a window through which a portion of the resilient tab is urged to protrude outwardly when the golf club extremity is inserted.

2. A golf pitch mark repairer as claimed in claim 1, wherein the resilient tab comprises a portion adapted and arranged to present an angled surface to the golf club extremity as it is inserted into the sleeve, thereby urging the resilient tab outwards.

3. A golf pitch mark repairer as claimed in claim 1, further comprising a sliding collar at least partly surrounding the sleeve that is slidable from a first position along the sleeve, in which the portion is able so to protrude when the golf club extremity is inserted, to a second position along the sleeve in which the sliding collar acts to urge the protruding portion back inwardly, thereby increasing a retaining force of the resilient tab on the golf club extremity when the sliding collar is in the second position.

4. A golf pitch mark repairer as claimed in claim 1, wherein the resilient tab and window are mutually formed from a wall of the sleeve.

5. A golf pitch mark repairer as claimed in claim 1, wherein the resilient tab comprises an curved-shape gripping portion.

6. A golf pitch mark repairer as claimed in claim 1, wherein the resilient tab is an elongate tab facing substantially along the length of the sleeve.

7. A golf pitch mark repairer as claimed in claim 6, wherein the resilient tab is fixed at one end thereof and free at the other.

8. A golf pitch mark repairer as claimed in claim 7, wherein the resilient tab comprises a portion adapted and arranged to present an angled surface to the golf club extremity as it is inserted into the sleeve, thereby urging the resilient tab outwards, and wherein the angled surface is provided towards the free end.

9. A golf pitch mark repairer as claimed in claim 6, wherein the resilient tab is fixed at both ends thereof.

10. A golf pitch mark repairer as claimed in claim 6, wherein at least one end of the resilient tab is fixed to or emanates from a side wall of the sleeve.

11. A golf pitch mark repairer as claimed in claim 1, comprising two or more such resilient tabs.

12. A golf pitch mark repairer as claimed in claim 11, wherein the two or more resilient tabs are arranged in an opposing fashion.

13. A golf pitch mark repairer as claimed in claim 11, comprising such a window corresponding to each resilient tab, and a portion of each resilient tab being urged to protrude outwardly through its corresponding window when the golf club extremity is inserted.

14. A golf pitch mark repairer as claimed in claim 1, wherein the sleeve is shaped at least internally to correspond at least to some degree to the shape of the golf club extremity.

15. A golf pitch mark repairer as claimed in claim 1, wherein the golf club extremity is an end portion of the golf club handle.

16. A golf pitch mark repairer as claimed in claim 1, wherein the golf club is a putter.

17. A golf pitch mark repairer as claimed in claim 1, wherein the sleeve has an open end and a closed end, the open end being for receiving the golf club extremity.

18. A golf pitch mark repairer as claimed in claim 17, wherein the sleeve is substantially enclosed except at its open end.

19. A golf pitch mark repairer as claimed in claim 1, wherein the sleeve has an enclosed cross section along at least part of its length.

20. A golf pitch mark repairer as claimed in claim 19, wherein at least an open end of the sleeve for receiving the golf club extremity has an enclosed cross section.

21. A golf pitch mark repairer as claimed in claim 1, wherein an open end of the sleeve for receiving the golf club extremity is substantially resilient to moderate outward radial forces applied at any point on its cross section, such as those forces applied when inserting the golf club extremity into the sleeve.

22. A golf pitch mark repairer as claimed in claim 1, wherein the sleeve is adapted when at rest to present an opening at least as large as a cross section of the golf club extremity.

* * * * *